(12) United States Patent
Rueggen et al.

(10) Patent No.: US 8,278,790 B2
(45) Date of Patent: Oct. 2, 2012

(54) COMBINED FREQUENCY CONVERTER AND ELECTRIC MOTOR HAVING CONVERTER HOUSING CONNECTED TO MOTOR HOUSING VIA ADAPTER

(75) Inventors: Christian Rueggen, Bochum (DE); Andrè Wustlich, Soest (DE); Harald Bartholomeizik, Unna (DE); Steffen Penzek, Bergkamen (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 470 days.

(21) Appl. No.: 12/622,905

(22) Filed: Nov. 20, 2009

(65) Prior Publication Data

US 2010/0127602 A1 May 27, 2010

(30) Foreign Application Priority Data

Nov. 21, 2008 (DE) .......................... 10 2008 058 511

(51) Int. Cl.
*H02K 11/00* (2006.01)
*H02K 5/22* (2006.01)
*H02K 11/04* (2006.01)
(52) U.S. Cl. ........................... 310/68 D; 310/71; 310/89
(58) Field of Classification Search ................ 310/68 D, 310/71, 89; *H02K 5/22, 5/00, 11/00, 11/04*
See application file for complete search history.

(56) References Cited

U.S. PATENT DOCUMENTS

| | | | | |
|---|---|---|---|---|
| 4,451,750 A | * | 5/1984 | Heuer et al. | 310/71 |
| 4,963,778 A | | 10/1990 | Jensen et al. | |
| 5,885,102 A | * | 3/1999 | Harting et al. | 439/527 |
| 6,229,232 B1 | * | 5/2001 | Roth-Stielow et al. | 310/52 |
| 2003/0200761 A1 | * | 10/2003 | Funahashi et al. | 62/228.4 |
| 2003/0230942 A1 | * | 12/2003 | Okubo et al. | 310/89 |
| 2005/0167183 A1 | * | 8/2005 | Tominaga et al. | 180/444 |

* cited by examiner

*Primary Examiner* — Quyen Leung
*Assistant Examiner* — Michael Andrews
(74) *Attorney, Agent, or Firm* — Brooks Kushman P.C.

(57) ABSTRACT

An assembly includes a frequency converter, a motor, and an adapter. The frequency converter and the motor both have housings with an opening. The adapter has a base part and a circuit board having first and second electrical connecting elements supported over a portion of a central opening of the base part. The adapter is between the housings with the central opening being between the openings of the housings. The base part is mechanically connected to the housings with the first electrical connecting element of the adapter engaging an electrical connecting element of the frequency converter via the opening of the converter housing and the central opening and with the second electrical connecting element of the adapter engaging an electrical connecting element of the motor via the opening of the motor housing and the central opening whereby the frequency converter and the motor are connected via the adapter.

18 Claims, 4 Drawing Sheets

COMBINED FREQUENCY CONVERTER AND ELECTRIC MOTOR HAVING CONVERTER HOUSING CONNECTED TO MOTOR HOUSING VIA ADAPTER

CROSS-REFERENCE TO RELATED APPLICATIONS

This application claims foreign priority benefits under 35 U.S.C. §119(a)-(d) to DE 10 2008 058 511.4, filed Nov. 21, 2008; the disclosure of which is hereby incorporated by reference.

BACKGROUND OF THE INVENTION

1. Field of the Invention

The present invention relates to a frequency converter for controlling an electric motor in which the frequency converter has a converter housing for installation on a housing of the motor, is connected on an input side to a power supply line leading into the converter housing for connection to a power supply, and is detachably connectable on an output side to the motor via plug-in connectors.

2. Background Art

Frequency converters are used as static frequency converters for operating electric motors, in particular asynchronous machines. The connection of a frequency converter and a motor to form a combined structural unit has advantages with respect to interfering electromagnetic influences, compared to installation of the frequency converter in a separate control cabinet apart from the motor.

DE 36 42 724 A1 (corresponds to U.S. Pat. No. 4,963,778) describes a frequency converter referred to in the Field of the Invention section above. The frequency converter is accommodated in a converter housing referred to as a terminal box. A power supply-side connecting line of the frequency converter, in the form of an attached cable, leads out from the converter housing. A connecting piece is integrally molded onto the converter housing. The connecting piece has plug pins for connecting the output side of the frequency converter to contacts of the motor. Installing the converter housing on the motor housing causes the plug pins to make contact with corresponding sockets on the motor side which are electrically connected to the motor windings.

This is an advantageous design for a frequency converter to be used with a motor having a motor housing correspondingly designed for the frequency converter. However, this design lacks flexibility when the frequency converter is to be used with different motors having different motor housings.

SUMMARY OF THE INVENTION

An object of the present invention is a frequency converter assembly having a frequency converter that is installable on a variety of different motor housings in a relatively highly flexible manner.

In carrying out the above object and other objects, the present invention provides a frequency converter assembly having a frequency converter, a motor, and an adapter. The frequency converter has a converter housing with an opening and further has an electrical connecting element. The motor has a motor housing with an opening and further has an electrical connecting element. The adapter has an adapter base part with a central opening. The adapter further has a circuit board supported on the adapter base part over a portion of the central opening. The circuit board includes a first electrical connecting element and a second electrical connecting element.

The converter housing, the motor housing, and the adapter are positioned such that the adapter is between the converter housing and the motor housing with the central opening of the adapter base part being between the openings of the converter housing and the motor housing. The adapter base part is mechanically connected to the converter housing and to the motor housing with the first electrical connecting element of the circuit board of the adapter being engaged to the electrical connecting element of the frequency converter via the opening of the converter housing and the central opening of the adapter base part and with the second electrical connecting element of the circuit board of the adapter being engaged to the electrical connecting element of the motor via the opening of the motor housing and the central opening of the adapter base part whereby the frequency converter and the motor are mechanically and electrically connected via the adapter.

A frequency converter assembly in accordance with embodiments of the present invention includes a frequency converter and an adapter. The frequency converter includes a converter housing. Via the adapter, the converter housing of the frequency converter is installable on a variety of different motor housings. In use, the adapter affixes the converter housing to a housing of a motor to thereby mechanically and electrically connect the frequency converter to the motor. In particular, the adapter is between the converter housing and the motor housing and is mechanically connected to the converter housing and to the motor housing. The adapter has electrical connecting elements which connect with corresponding electrical connecting elements of the frequency converter and of the motor to thereby electrically connect the frequency converter to the motor.

In an embodiment, the adapter includes a circuit board. The circuit board includes first and second electrical connecting elements. The first electrical connecting elements are for electrically connecting with the motor connecting lines (e.g., motor windings). The second electrical connecting elements are for electrically connecting with electrical connecting elements of a printed circuit board (PCB) fixed in the converter housing of the frequency converter.

In an embodiment, the first electrical connecting elements are a screw terminal strip and the second electrical connecting elements are a plug-in connector strip. Individual contacts of the screw terminal strip and of the plug-in connector strip are electrically connected to one another on the circuit board by electrical conductors.

Tolerance compensation between the circuit board of the adapter and the PCB of the frequency converter is achieved as the adapter includes an essentially plate-shaped adapter base part having a central opening and the circuit board of the adapter is supported in a floating manner with respect to central opening of the adapter base part.

In an embodiment, the PCB of the frequency converter has positioning pins. The positioning pins are securely connected to the PCB. The circuit board of the adapter has corresponding positioning holes. The positioning pins of the PCB are associated with the positioning holes of the circuit board such that when the converter housing and the adapter are joined together, the circuit board is positioned so that the plug-in connector strip of the adapter and an associated mating connector part of the PCB of the frequency converter properly engage and make electrical contact with one another.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
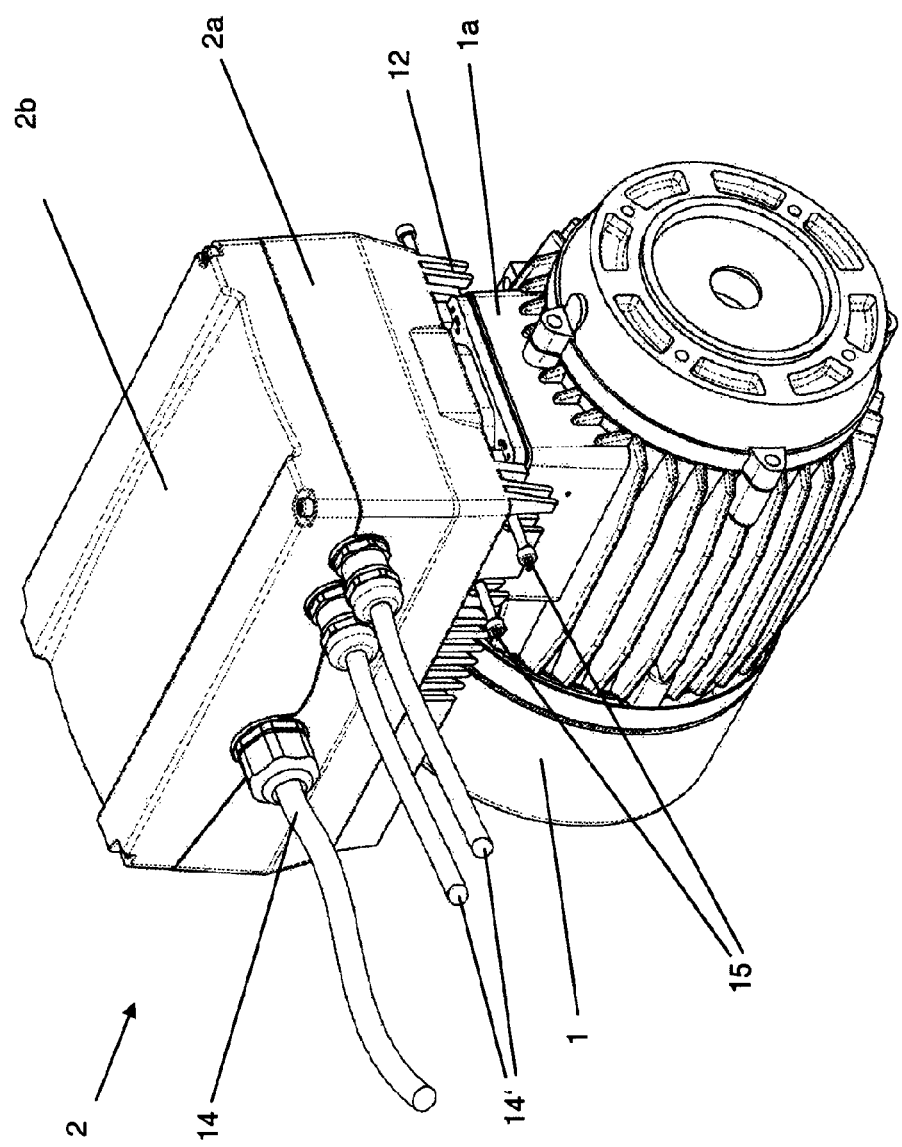
FIG. 1 illustrates a frequency converter assembly in accordance with an embodiment of the present invention in which the frequency converter assembly includes a frequency converter installed via an adapter onto a motor housing of an electric motor.
Figure 2:
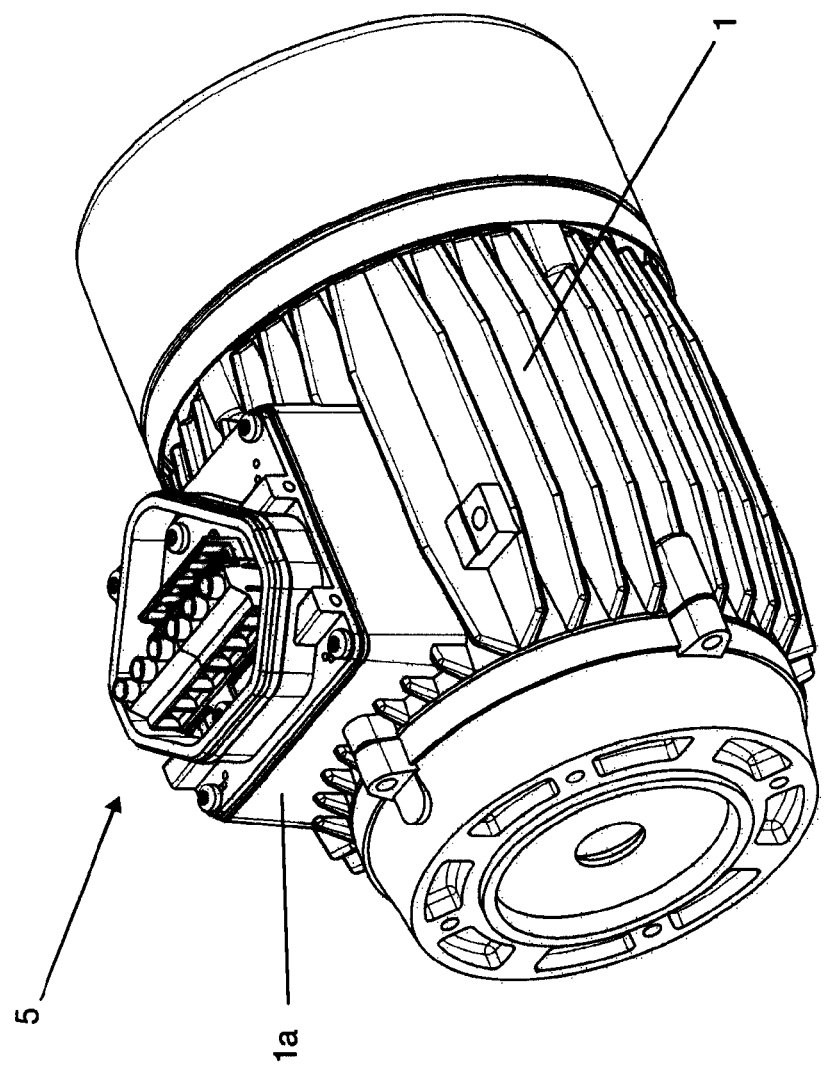
FIG. 2 illustrates the motor with the adapter mounted thereon for accommodating the frequency converter.

Referring now to FIGS. 1 and 2, a frequency converter assembly in accordance with an embodiment of the present invention is shown. The frequency converter assembly includes a frequency converter having a converter housing 2. The frequency converter further includes an adapter 5 (shown in FIG. 2). Via adapter 5, converter housing 2 of the frequency converter is installed onto a motor housing 1 of an electric motor. To this end, as will be described, adapter 5 is mounted between converter housing 2 of the frequency converter and motor housing 1 of the motor. Adapter 5 is mechanically connected to converter housing 2 and motor housing 1 to thereby mechanically connect the frequency converter and the motor. Adapter 5 includes electrical connecting elements which connect with corresponding electrical connecting elements of the frequency converter and the motor to thereby electrically connect the frequency converter and the motor. FIG. 1 illustrates converter housing 2 installed onto motor housing 1. FIG. 2 illustrates adapter 5 mounted on motor housing 1 for accommodating installation of converter housing 2 to motor housing 1.

Converter housing 2 includes a lower housing part 2a and a housing cover 2b. Lower housing part 2a is to be mounted to adapter 5 and meets other functional requirements. Housing cover 2b closes off converter housing 2.

Figure 4:
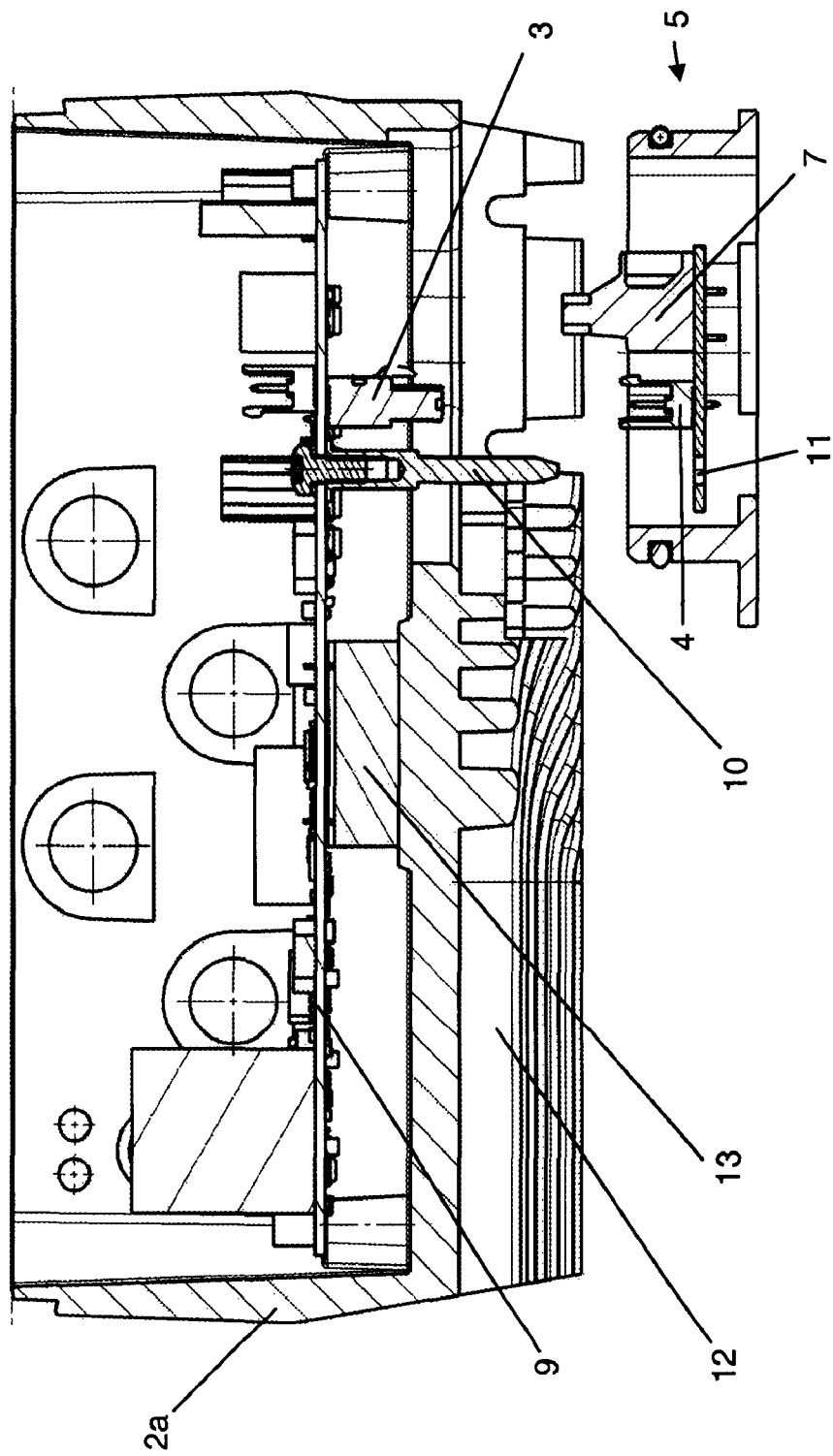
FIG. 4 illustrates a longitudinal sectional view of the lower part of a converter housing of the frequency converter and the adapter.

Lower housing part 2a of converter housing 2 contains a printed circuit board (PCB) 9 (shown in FIG. 4). PCB 9 accommodates electronic components such as power components 13 of a control and power electronics system of the frequency converter. Lower housing part 2a may be composed of a material having high thermal conductivity such as aluminum. Lower housing part 2a includes cooling ribs 12 on its lower outer wall. Cooling ribs 12 dissipate heat generated by power components 13 of PCB 9 of the frequency converter. For this purpose, power components 13 are positioned on PCB 9 such that they are in direct contact with this lower outer wall.

A power supply line 14 connected to a power supply (not shown) and other control and/or sensor lines 14' lead into the interior of converter housing 2 at the lateral outer wall of converter housing 2 in order to accommodate power and other control and/or sensor requirements of the frequency converter.

As indicated, lower housing part 2a of converter housing 2 is mechanically fastened to motor housing 1 by adapter 5. Adapter 5 is first screwed onto a connecting piece 1a of motor housing 1 (see FIG. 2). Lower housing part 2a is then fastened to adapter 5 by screws 15.

Figure 3:
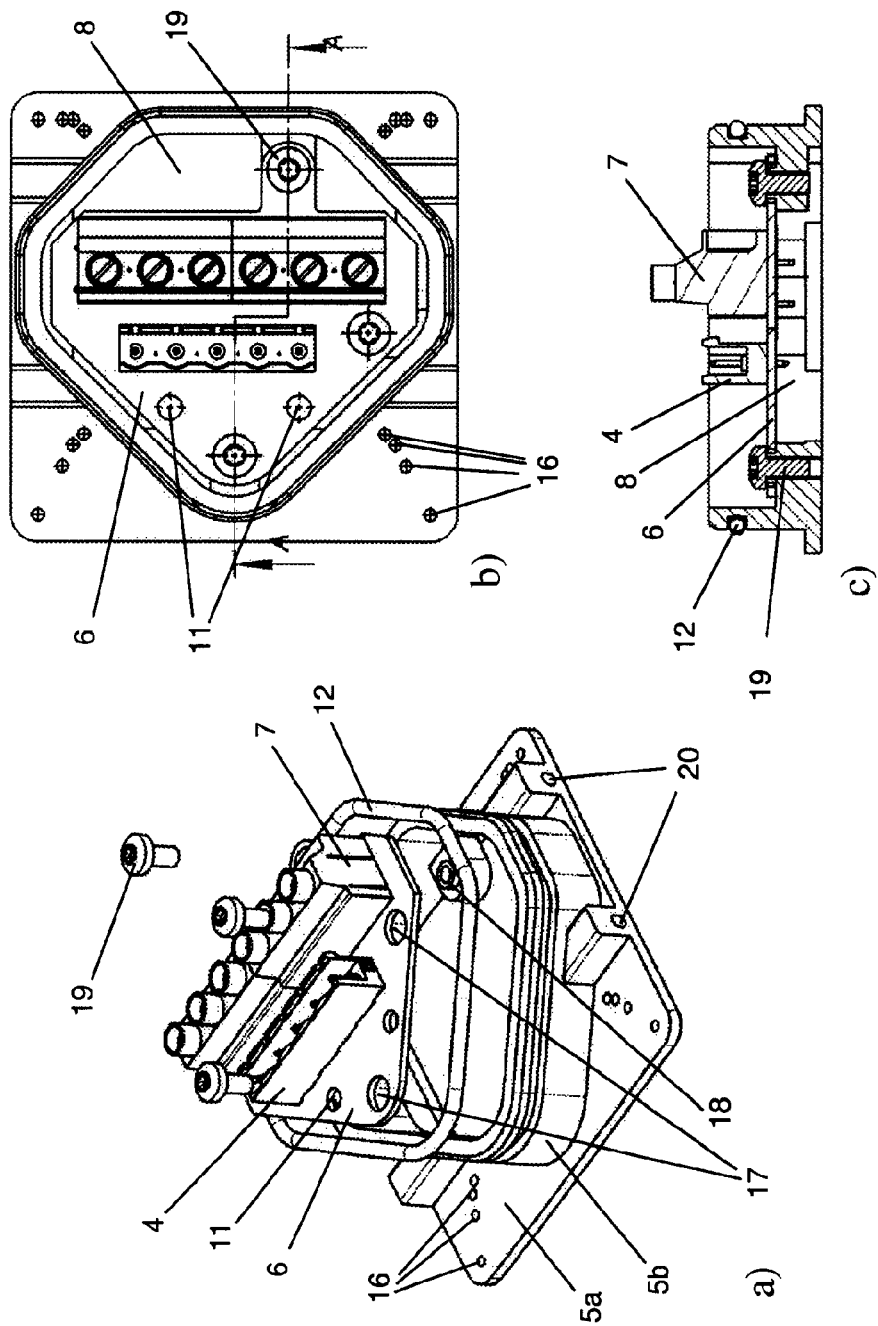
FIG. 3a illustrates an exploded view of the adapter.
FIG. 3b illustrates a top view of the adapter.
FIG. 3c illustrates the longitudinal sectional view of the adapter along the line A-A of FIG. 3b.

Referring now to FIGS. 3a, 3b, and 3c, with continual reference to FIGS. 1 and 2, various views of adapter 5 are shown. In particular, FIG. 3a illustrates an exploded view of adapter 5; FIG. 3b illustrates a top view of adapter 5; and FIG. 3c illustrates the longitudinal sectional view of adapter 5 along the line A-A of FIG. 3b.

Adapter 5 includes an essentially plate-shaped adapter base part 5a. Depending on thermal and/or strength requirements to be met in a particular configuration, adapter base part 5a may be composed of a metallic material such as aluminum or of a non-metallic material such as fiberglass-reinforced plastic.

Adapter base part 5a includes a central opening 8. Central opening 8 is surrounded by a collar 5b. Collar 5b is integrally molded on adapter base part 5a in one piece. In its upper exterior region, collar 5b has a sealing element 12. Sealing element 12 is to provide sealing between adapter 5 and lower housing part 2a of converter housing 2 mounted thereto. In this embodiment, sealing element 12 is an O-ring seal. O-ring seal 12 is accommodated in a circumferential groove on the exterior of collar 5b. The outer contour of collar 5b is designed to fit in a corresponding opening in the lower outer wall of lower housing part 2a of converter housing 2 so that converter housing 2 provides a tight seal with adapter 5 when mounted thereon.

By use of adapter 5 it is possible to install the frequency converter (i.e., converter housing 2) on a variety of different motor housings. Basically, the only requirement is that adapter base part 5a completely covers the opening of connecting piece 1a of a motor housing such as motor housing 1. To this end, screw holes in adapter base part 5a are bored so as to correspond to a threaded hole pattern of connecting piece 1a of the affected motor housing 1. This is indicated in FIGS. 3a and 3b by several possible screw points 16 on adapter base part 5a.

Adapter 5 includes a circuit board 6, which may be in the form of a printed circuit board. The interior of collar 5b of adapter 5 accommodates circuit board 6. Circuit board 6 partially covers central opening 8 surrounded by collar 5b. A screw terminal strip 7 and a plug-in connector part 4 are provided in parallel on circuit board 6. Screw terminal strip 7 may alternatively be embodied as a spring-loaded terminal strip or the like. In this embodiment, plug-in connector part 4 is a plug-in connector strip. Screw terminal strip 7 serves to electrically connect with the motor connecting lines (e.g., the motor windings). The motor connecting lines are led through the remaining region of central opening 8 in adapter base part 5a next to circuit board 6. Plug-in connector part 4 serves to electrically contact corresponding mating connector part 3 of PCB 9 of the frequency converter. In this case, mating connector part 3 is a socket strip on PCB 9. The individual contacts of screw terminal strip 7 and of plug-in connector part 4 are electrically connected to one another on circuit board 6 of adapter 5 by electrical conductors.

Accordingly, an electrical connection is established between the motor (i.e., the motor connecting lines) and the frequency converter (i.e., PCB 9 of the frequency converter) when the motor connecting lines are electrically connected to screw terminal strip 7 and mating connector part 3 of PCB 9 is electrically connected to plug-in connector part 4. As described, such electrical connections are established via corresponding mechanical connections when converter housing 2 of the frequency converter is mounted to motor housing 1 of motor via adapter 5.

For tolerance compensation between circuit board 6 of adapter 5 and PCB 9 of the frequency converter, circuit board 6 is supported in a floating manner with respect to adapter base part 5a. For this purpose, fastening holes 17 in circuit board 6 have an oversized diameter relative to associated positioning sleeves 18 on adapter base part 5a. When tightened, fastening screws 19 reach their locking position on positioning sleeves 18 prior to the screw heads being able to make a frictional connection with circuit board 6. Thus, although the height of circuit board 6 is fixed, the lateral position of circuit board 6 is freely movable to a certain degree.

Referring now to FIG. 4, with continual reference to the previous FIGS., a longitudinal sectional view of lower housing part 2a of converter housing 2 of the frequency converter and adapter 5 is shown. When converter housing 2 is placed on adapter 5, which has been previously screwed onto motor housing 1, a pair of positioning pins 10 securely connected to PCB 9 of the frequency converter initially engage in associated positioning holes 11 on circuit board 6 of adapter 5. In the further joining operation, circuit board 6 is thus positioned so that plug-in connector part 4 of adapter 5 and the associated mating connector part 3 of PCB 9 of the frequency converter are able to properly engage and make electrical contact with one another. In its intended position, lower housing part 2a is then affixed to adapter base part 5a by laterally guided screws 15 which are screwed into screw holes 20 on adapter base part 5a.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A frequency converter assembly comprising:
   a frequency converter having a converter housing with an opening, the frequency converter further having a circuit board which accommodates frequency converter electronic components, wherein the circuit board of the frequency converter is within the converter housing and includes an electrical connecting element;
   a motor having a motor housing with an opening, the motor further having an electrical connecting element; and
   an adapter having an adapter base part with a central opening, the adapter further having a circuit board supported on the adapter base part over a portion of the central opening, wherein the circuit board of the adapter includes a first electrical connecting element and a second electrical connecting element;
   wherein the converter housing, the motor housing, and the adapter are positioned such that the adapter is between the converter housing and the motor housing with the central opening of the adapter base part being between the openings of the converter housing and the motor housing;
   wherein the adapter base part is mechanically connected to the converter housing and to the motor housing with the first electrical connecting element of the circuit board of the adapter being engaged to the electrical connecting element of the frequency converter via the opening of the converter housing and the central opening of the adapter base part and with the second electrical connecting element of the circuit board of the adapter being engaged to the electrical connecting element of the motor via the opening of the motor housing and the central opening of the adapter base part whereby the frequency converter and the motor are mechanically and electrically connected via the adapter;
   wherein the circuit board of the adapter is floatingly supported on the adapter base part such that the circuit board of the adapter is freely movable laterally with respect to the central opening while being longitudinally fixed in place between the converter housing and the motor housing.

2. The assembly of claim 1 wherein:
the frequency converter is connected on an input side to a power supply line led into the converter housing for connection to an external power supply.

3. The assembly of claim 1 wherein:
the adapter base part of the adapter is plate-shaped.

4. The assembly of claim 1 wherein:
the first electrical connecting element of the adapter is a plug-in connector part and the second electrical connecting element of the adapter is a socket terminal strip;
wherein the electrical connecting element of the frequency converter is a mating connector part associated with the plug-in connector part of the adapter.

5. The assembly of claim 1 wherein:
the adapter further includes a collar, wherein the collar surrounds the central opening of the adapter base part of the adapter.

6. The assembly of claim 5 wherein:
the collar is integrally molded on the adapter base part of the adapter in one piece.

7. The assembly of claim 6 wherein:
the collar has a sealing element for forming a seal with the opening of the converter housing of the frequency converter when the adapter is mechanically connected to the frequency converter.

8. The assembly of claim 7 wherein:
the sealing element is an O ring seal accommodated in a circumferential groove on the collar.

9. The assembly of claim 1 wherein:
the first electrical connecting element of the adapter is a plug-in connector strip and the second electrical connecting element of the adapter is a screw terminal strip, wherein individual contacts of the plug-in connector strip and of the screw terminal strip are electrically connected to one another on the circuit board of the adapter by conductors.

10. A frequency converter assembly comprising:
   a frequency converter having a converter housing with an opening, the frequency converter further having an electrical connecting element;
   a motor having a motor housing with an opening, the motor further having an electrical connecting element; and
   an adapter having an adapter base part with a central opening, the adapter further having a circuit board supported on the adapter base part over a portion of the central opening, wherein the circuit board includes a first electrical connecting element and a second electrical connecting element;
   wherein the converter housing, the motor housing, and the adapter are positioned such that the adapter is between the converter housing and the motor housing with the central opening of the adapter base part being between the openings of the converter housing and the motor housing;

wherein the adapter base part is mechanically connected to the converter housing and to the motor housing with the first electrical connecting element of the circuit board of the adapter being engaged to the electrical connecting element of the frequency converter via the opening of the converter housing and the central opening of the adapter base part and with the second electrical connecting element of the circuit board of the adapter being engaged to the electrical connecting element of the motor via the opening of the motor housing and the central opening of the adapter base part whereby the frequency converter and the motor are mechanically and electrically connected via the adapter;

wherein the frequency converter further includes a printed circuit board fixed in the converter housing, the printed circuit board having the electrical connecting element of the frequency converter, wherein the printed circuit board has positioning pins which are securely connected to the printed circuit board;

wherein the circuit board of the adapter has positioning holes;

wherein the positioning pins of the printed circuit board of the frequency converter are associated with the positioning holes of the circuit board of the adapter such that when the converter housing and the adapter are mechanically connected together the circuit board of the adapter is positioned so that the first electrical connecting element of the adapter engages the electrical connecting element of the frequency converter.

11. The assembly of claim 10 wherein:
the first electrical connecting element of the adapter is a plug-in connector part and the electrical connecting element of the frequency converter is an associated mating connector part.

12. The assembly of claim 10 wherein:
the adapter base part of the adapter is plate-shaped.

13. The assembly of claim 10 wherein:
the circuit board of the adapter is floatingly supported on the adapter base part.

14. The assembly of claim 6 wherein:
the first electrical connecting element of the adapter is a plug-in connector part and the second electrical connecting element of the adapter is a socket terminal strip;
wherein the electrical connecting element of the frequency converter is a mating connector part associated with the plug-in connector part of the adapter.

15. The assembly of claim 10 wherein:
the adapter further includes a collar, wherein the collar surrounds the central opening of the adapter base part of the adapter.

16. The assembly of claim 15 wherein:
the collar is integrally molded on the adapter base part of the adapter in one piece.

17. The assembly of claim 16 wherein:
the collar has a sealing element for forming a seal with the opening of the converter housing of the frequency converter when the adapter is mechanically connected to the frequency converter.

18. The assembly of claim 10 wherein:
the first electrical connecting element of the adapter is a plug-in connector strip and the second electrical connecting element of the adapter is a screw terminal strip, wherein individual contacts of the plug-in connector strip and of the screw terminal strip are electrically connected to one another on the circuit board of the adapter by conductors.

* * * * *